United States Patent
Bélanger et al.

(10) Patent No.: US 10,518,499 B2
(45) Date of Patent: Dec. 31, 2019

(54) FOLDABLE COMPOSITE MATERIAL SHEET AND STRUCTURE

(71) Applicant: CORRUVEN CANADA INC., Kedgwick (CA)

(72) Inventors: Alain Bélanger, Kedgwick (CA); Alex Matson, Kedgwick (CA)

(73) Assignee: CORRUVEN CANADA INC., Kedgwick (CA)

( * ) Notice: Subject to any disclaimer, the term of this patent is extended or adjusted under 35 U.S.C. 154(b) by 152 days.

(21) Appl. No.: 15/714,965

(22) Filed: Sep. 25, 2017

(65) Prior Publication Data

US 2018/0086021 A1   Mar. 29, 2018

Related U.S. Application Data

(60) Provisional application No. 62/399,546, filed on Sep. 26, 2016.

(51) Int. Cl.
  *B32B 1/00* (2006.01)
  *B32B 1/08* (2006.01)
  (Continued)

(52) U.S. Cl.
  CPC .................. *B32B 3/04* (2013.01); *B32B 1/00* (2013.01); *B32B 1/08* (2013.01); *B32B 3/28* (2013.01); *B32B 21/04* (2013.01); *B32B 21/06* (2013.01); *B32B 21/14* (2013.01); *B32B 29/002* (2013.01); *B32B 37/14* (2013.01); *B32B 38/04* (2013.01); *B65D 5/5033* (2013.01); *B65D 5/5092* (2013.01); *B65D 5/5095* (2013.01);
  (Continued)

(58) Field of Classification Search
  None
  See application file for complete search history.

(56) References Cited

U.S. PATENT DOCUMENTS

| 974,871 A | * | 11/1910 | Ferres | B65D 5/58 |
| | | | | 206/521 |
| 1,154,138 A | * | 9/1915 | Staley | B32B 1/00 |
| | | | | 144/329 |

(Continued)

FOREIGN PATENT DOCUMENTS

| CN | 201645579 U | * | 11/2010 | ............. E04C 2/405 |
| CN | 202029185 U | * | 11/2011 | |

(Continued)

OTHER PUBLICATIONS

English Abstract/Google Translation/Machine Translation for ES 8801993 A1, Jan. 1987 (Year: 1987).*

(Continued)

*Primary Examiner* — Jeffrey A Vonch
(74) *Attorney, Agent, or Firm* — Norton Rose Fulbright Canada LLP (57) ABSTRACT

A composite material and structure. The structure has a folded sheet having a rigid inner layer sandwiched between flexible outer layers. The sheet has an undulated shape with alternating summit and valley portions. Intermediate portions each extend between adjacent summit and valley portions. At least one score line extends through at least one of the flexible outer layers. The sheet is folded about the at least one score line. A method of forming a structure from a sheet having an undulated shape.

21 Claims, 8 Drawing Sheets

(51) Int. Cl.
*B32B 3/04* (2006.01)
*B32B 3/28* (2006.01)
*B32B 21/06* (2006.01)
*B32B 21/14* (2006.01)
*B32B 29/00* (2006.01)
*B65D 5/50* (2006.01)
*B65D 81/05* (2006.01)
*B32B 37/14* (2006.01)
*B32B 38/04* (2006.01)
*B32B 21/04* (2006.01)
B27D 1/06 (2006.01)
B27D 1/08 (2006.01)
B32B 38/00 (2006.01)
B32B 3/26 (2006.01)
B32B 1/04 (2006.01)
B32B 38/18 (2006.01)
B65D 81/127 (2006.01)
B65D 81/107 (2006.01)
B65D 71/04 (2006.01)

(52) U.S. Cl.
CPC ........... *B65D 81/05* (2013.01); *B65D 81/053* (2013.01); *B27D 1/06* (2013.01); *B27D 1/08* (2013.01); *B32B 1/04* (2013.01); *B32B 3/266* (2013.01); *B32B 38/1866* (2013.01); *B32B 2038/0052* (2013.01); *B32B 2250/03* (2013.01); *B32B 2250/40* (2013.01); *B32B 2317/12* (2013.01); *B32B 2553/00* (2013.01); *B32B 2553/02* (2013.01); *B65D 5/505* (2013.01); *B65D 5/5054* (2013.01); *B65D 5/5057* (2013.01); *B65D 71/04* (2013.01); *B65D 81/054* (2013.01); *B65D 81/107* (2013.01); *B65D 81/127* (2013.01); *Y10T 428/13* (2015.01); *Y10T 428/1303* (2015.01); *Y10T 428/2419* (2015.01); *Y10T 428/24322* (2015.01); *Y10T 428/24331* (2015.01); *Y10T 428/24661* (2015.01); *Y10T 428/24694* (2015.01)

(56) References Cited

U.S. PATENT DOCUMENTS

| | | | | |
|---|---|---|---|---|
| 1,808,530 A * | 6/1931 | Cooley | B65D 5/5092 | 229/122.33 |
| 1,817,286 A * | 8/1931 | Beaman | B65D 5/5033 | 206/586 |
| 1,852,832 A * | 4/1932 | Beaman | B65D 81/054 | 206/586 |
| 2,077,162 A * | 4/1937 | Ansel | E04D 3/362 | 52/520 |
| 2,142,547 A * | 1/1939 | Anderson | A47F 11/00 | 40/539 |
| 2,142,549 A * | 1/1939 | Anderson | A47F 11/00 | 40/539 |
| 2,160,221 A * | 5/1939 | Masters | B65D 5/5033 | 206/586 |
| 2,274,765 A * | 3/1942 | Zalkind | A47B 96/201 | 428/133 |
| 2,622,051 A * | 12/1952 | Hermanson | B31F 1/2895 | 428/154 |
| 2,702,682 A * | 2/1955 | Newsom | B65D 19/0028 | 108/51.3 |
| 2,719,808 A * | 10/1955 | Elmendorf | B31F 1/08 | 156/257 |
| 2,741,362 A * | 4/1956 | Cortright | B65D 5/504 | 206/453 |
| 3,003,204 A * | 10/1961 | Bryant | B27D 1/08 | 428/114 |
| 3,135,228 A * | 6/1964 | Fleming | B65D 19/0085 | 108/57.34 |
| 3,337,111 A * | 8/1967 | Petriekis | B65D 5/5033 | 206/586 |
| 3,416,652 A * | 12/1968 | Almasy | B65D 71/04 | 206/453 |
| 3,613,985 A * | 10/1971 | Goodsite | B65D 81/054 | 206/586 |
| 3,616,112 A * | 10/1971 | Desai | E04C 2/24 | 428/48 |
| 3,648,920 A * | 3/1972 | Stump | B65D 5/5033 | 229/199 |
| 3,743,568 A * | 7/1973 | De Wolf | B65D 65/403 | 428/178 |
| 3,955,744 A * | 5/1976 | Casutt | B65B 23/02 | 206/521.1 |
| 4,120,441 A * | 10/1978 | Hurley | B65D 5/5088 | 206/453 |
| 4,202,449 A * | 5/1980 | Bendt | B65D 81/054 | 206/453 |
| 4,241,832 A * | 12/1980 | Bliss | B65D 81/05 | 206/523 |
| 4,428,792 A * | 1/1984 | Kurita | E04C 3/14 | 156/196 |
| 4,429,012 A * | 1/1984 | Danko | B27D 1/06 | 428/12 |
| 4,623,072 A * | 11/1986 | Lorenz | B65D 5/4266 | 229/122.32 |
| 4,784,270 A * | 11/1988 | Layer | B65D 81/054 | 206/320 |
| 4,811,840 A | 3/1989 | Muyskens | | |
| 4,865,912 A * | 9/1989 | Mitsumata | B27D 1/00 | 442/378 |
| 4,871,063 A * | 10/1989 | Kumbier | B32B 1/00 | 206/386 |
| 4,948,039 A * | 8/1990 | Amatangelo | B65D 5/20 | 229/198 |
| 5,040,684 A * | 8/1991 | Knowles | B65D 59/00 | 206/326 |
| 5,040,696 A * | 8/1991 | Liebel | B65D 5/5028 | 206/521 |
| 5,175,041 A * | 12/1992 | Webb | B65D 65/44 | 206/586 |
| 5,267,651 A * | 12/1993 | Hughes | B65D 5/5033 | 206/453 |
| 5,374,464 A * | 12/1994 | Jacobsen | B60P 7/135 | 410/121 |
| 5,511,667 A * | 4/1996 | Carder | B65D 65/44 | 206/521 |
| 5,525,395 A * | 6/1996 | Huang | B31D 3/0215 | 428/116 |
| 5,532,044 A * | 7/1996 | Jen | B65D 5/5035 | 206/193 |
| 5,690,601 A * | 11/1997 | Cummings | B31F 1/0012 | 493/340 |
| 5,750,235 A * | 5/1998 | Yoshimasa | B31F 1/0009 | 428/182 |
| 5,794,542 A | 8/1998 | Besaw | | |
| 5,944,252 A * | 8/1999 | Connelly | B31D 3/005 | 229/132 |
| 5,948,198 A * | 9/1999 | Blyt | B27D 1/08 | 144/346 |
| 6,039,184 A * | 3/2000 | Gale | B65D 81/056 | 206/586 |
| 6,132,349 A * | 10/2000 | Yokoyama | B31F 1/0012 | 493/86 |
| 6,183,836 B1 * | 2/2001 | Pflug | E04C 2/3405 | 428/116 |
| 6,186,329 B1 | 2/2001 | Qiu | | |
| 6,190,756 B1 * | 2/2001 | Yokoyama | B65D 5/5033 | 428/182 |
| 6,286,683 B1 * | 9/2001 | Hunt | B65D 81/054 | 206/320 |
| 6,446,858 B1 * | 9/2002 | Louman | B65D 5/4266 | 229/5.82 |
| 6,513,662 B1 | 2/2003 | Stebelton | | |

(56) References Cited

U.S. PATENT DOCUMENTS

| | | | | |
|---|---|---|---|---|
| 6,527,895 B1 * | 3/2003 | Palmer | E06B 9/262 | 156/193 |
| 6,536,654 B2 * | 3/2003 | Reynolds | B65D 5/48 | 206/593 |
| 6,561,357 B2 * | 5/2003 | Renck | B65D 81/054 | 206/320 |
| 7,045,196 B1 * | 5/2006 | Hill | B32B 29/08 | 428/137 |
| 7,128,214 B2 | 10/2006 | Qiu et al. | | |
| 7,159,345 B2 | 1/2007 | Hunt | | |
| 7,255,910 B1 * | 8/2007 | Seckel | B32B 1/00 | 206/585 |
| 7,383,952 B2 | 6/2008 | Kruelle et al. | | |
| 7,625,616 B2 | 12/2009 | Van de Camp | | |
| 8,443,975 B2 | 5/2013 | Butch, Jr. et al. | | |
| 9,511,920 B2 | 12/2016 | Baker et al. | | |
| 2001/0031339 A1 * | 10/2001 | Johnson | B32B 3/28 | 428/179 |
| 2005/0082200 A1 * | 4/2005 | Robinson, Jr. | B65D 81/054 | 206/586 |
| 2005/0087663 A1 | 4/2005 | Schroeder | | |
| 2005/0121357 A1 * | 6/2005 | Robinson, Jr. | B65D 81/054 | 206/586 |
| 2005/0241267 A1 * | 11/2005 | Wu | B27D 1/06 | 52/783.11 |
| 2006/0141215 A1 * | 6/2006 | Jonsson | B29C 53/26 | 428/156 |
| 2007/0039697 A1 * | 2/2007 | Sun | E06B 9/262 | 160/84.05 |
| 2007/0266893 A1 * | 11/2007 | So | B29B 17/0042 | 106/164.1 |
| 2008/0131654 A1 * | 6/2008 | Bradford | B29C 53/063 | 428/118 |
| 2009/0255205 A1 * | 10/2009 | Noble | B32B 3/10 | 52/630 |
| 2010/0072096 A1 | 3/2010 | Wu et al. | | |
| 2010/0187153 A1 * | 7/2010 | Simms | B65D 81/054 | 206/586 |
| 2010/0244319 A1 * | 9/2010 | Trost | B27D 5/00 | 264/293 |
| 2011/0265942 A1 * | 11/2011 | Belanger | B27D 1/06 | 156/210 |
| 2013/0316125 A1 * | 11/2013 | Moeller | E04C 2/322 | 428/106 |
| 2014/0069842 A1 * | 3/2014 | D'Anglade | B65D 81/054 | 206/586 |
| 2017/0107041 A1 | 4/2017 | Baker et al. | | |

FOREIGN PATENT DOCUMENTS

| | | | | | |
|---|---|---|---|---|---|
| CN | 102390066 | A | * | 3/2012 | |
| CN | 102529175 | A | * | 7/2012 | |
| DE | 102008022805 | A1 | * | 11/2009 | B27D 1/06 |
| DE | 102008022806 | A1 | * | 11/2009 | B27D 1/06 |
| EP | 0441149 | A1 | * | 8/1991 | B65D 5/445 |
| ES | 8801993 | A1 | * | 1/1987 | |
| FR | 2673603 | A1 | * | 9/1992 | B65D 71/04 |
| GB | 121026 | A | * | 12/1918 | B27D 1/083 |
| GB | 471136 | A | * | 8/1937 | B65D 5/5035 |
| GB | 508329 | A | * | 6/1939 | E04C 2/405 |
| JP | 62157217 | U | * | 10/1987 | B31C 1/00 |
| JP | 07033169 | A | * | 2/1995 | B31F 1/2895 |
| JP | 07068676 | A | * | 3/1995 | |
| JP | 07125776 | A | * | 5/1995 | |
| JP | 07040103 | U | * | 7/1995 | |
| JP | 07195588 | A | * | 8/1995 | B65D 5/445 |
| JP | 10278014 | A | * | 10/1998 | |
| JP | 2002255157 | A | * | 9/2002 | B27D 1/06 |
| JP | 2003103666 | A | * | 4/2003 | |
| JP | 2012214051 | A | * | 11/2012 | B65D 5/5035 |
| JP | 2014019033 | A | * | 2/2014 | B27D 1/06 |
| WO | WO-9209500 | A1 | * | 6/1992 | B31C 1/00 |
| WO | WO-9209501 | A1 | * | 6/1992 | B65D 81/05 |
| WO | WO-9412344 | A1 | * | 6/1994 | B31F 1/2895 |
| WO | WO-0185409 | A1 | * | 11/2001 | B27D 1/06 |

OTHER PUBLICATIONS

Davpack The Original Packaging Store "Perforated Cardboard Edge Protectors" Retrieved from the Internet on Aug. 11, 2017 [https://www.davpack.co.uk/protectivepackaging/edgecornerprotection/perforatededgeprotectors.htm].

"Tuff Angle Edge Protectors" Retrieved from the Internet on Aug. 11, 2017 [http://www.edgeprotectors.us/product.html].

* cited by examiner

FIG. 3B

FOLDABLE COMPOSITE MATERIAL SHEET AND STRUCTURE

CROSS-REFERENCE TO RELATED APPLICATIONS

This application claims priority from U.S. provisional patent application No. 62/399,546 filed Sep. 26, 2016, the entire contents of which are incorporated by reference herein.

TECHNICAL FIELD

The application relates generally to sheets of material and, more particularly, to a foldable composite material sheet.

BACKGROUND

Conventional sheets of material can be folded, cut, or otherwise manipulated to form different shapes and configurations. When it assumes the desired shape or configuration, the sheet can be fixed in position or combined with another element to create the final object. Forming objects in this way can be time consuming, cumbersome, require many tools, require adhesives or mechanical fasteners, or require the intervention of a machine. Furthermore, the final object may not provide the desired structural properties, and thus require reinforcement.

SUMMARY

In an aspect, there is provided a composite material being foldable to form a structure, comprising: a sheet having a rigid inner layer sandwiched between flexible outer layers, the sheet having an undulated shape with alternating summit and valley portions, and intermediate portions each extending between adjacent summit and valley portions, the sheet being foldable about at least one score line to form the structure, the at least one score line extending through at least one of the flexible outer layers.

In another aspect, there is provided a structure, comprising: a folded sheet having a rigid inner layer sandwiched between flexible outer layers, the sheet having an undulated shape with alternating summit and valley portions, and intermediate portions each extending between adjacent summit and valley portions, at least one score line extending through at least one of the flexible outer layers, the sheet being folded about the at least one score line.

In yet another aspect, there is provided a method of forming a structure from a sheet having an undulated shape and a rigid inner layer sandwiched between flexible outer layers, the method comprising: making a tear in the sheet through at least one of the flexible outer layers of the sheet to define a score line; and folding the sheet about the score line to form the structure.

In accordance with another aspect, there is provided a structure, comprising: a folded sheet having at least two flexible paper layers being superimposed, the sheet having an undulated shape with alternating summit and valley portions, and intermediate portions each extending between adjacent summit and valley portions, at least one score line extending through at least one of the flexible paper layers and not all the flexible paper layers, the sheet being folded about the at least one score line.

DESCRIPTION OF DRAWINGS

Reference is now made to the accompanying figures in which:

FIG. 6 is a perspective view of a sheet to form yet another structure, according to yet another embodiment of the present disclosure.

DETAILED DESCRIPTION

Figure 1A:
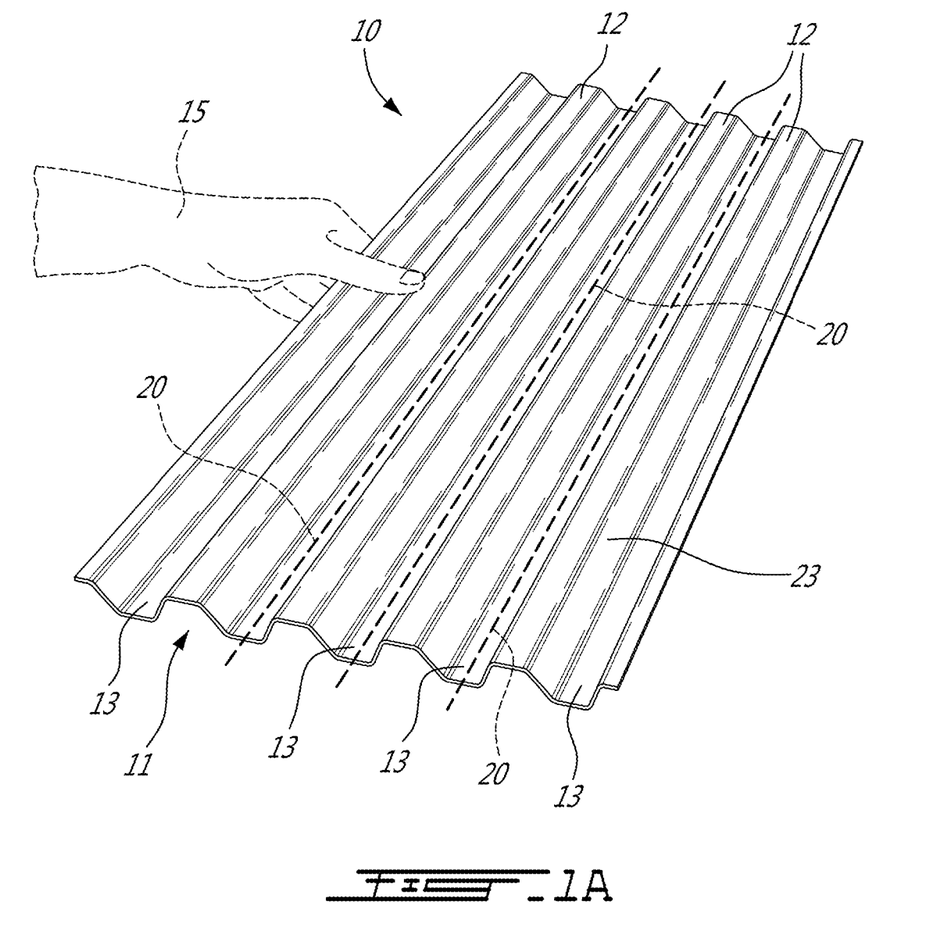
FIG. 1A is a perspective view of a sheet of a composite material, according to an embodiment of the present disclosure.
Figure 1B:
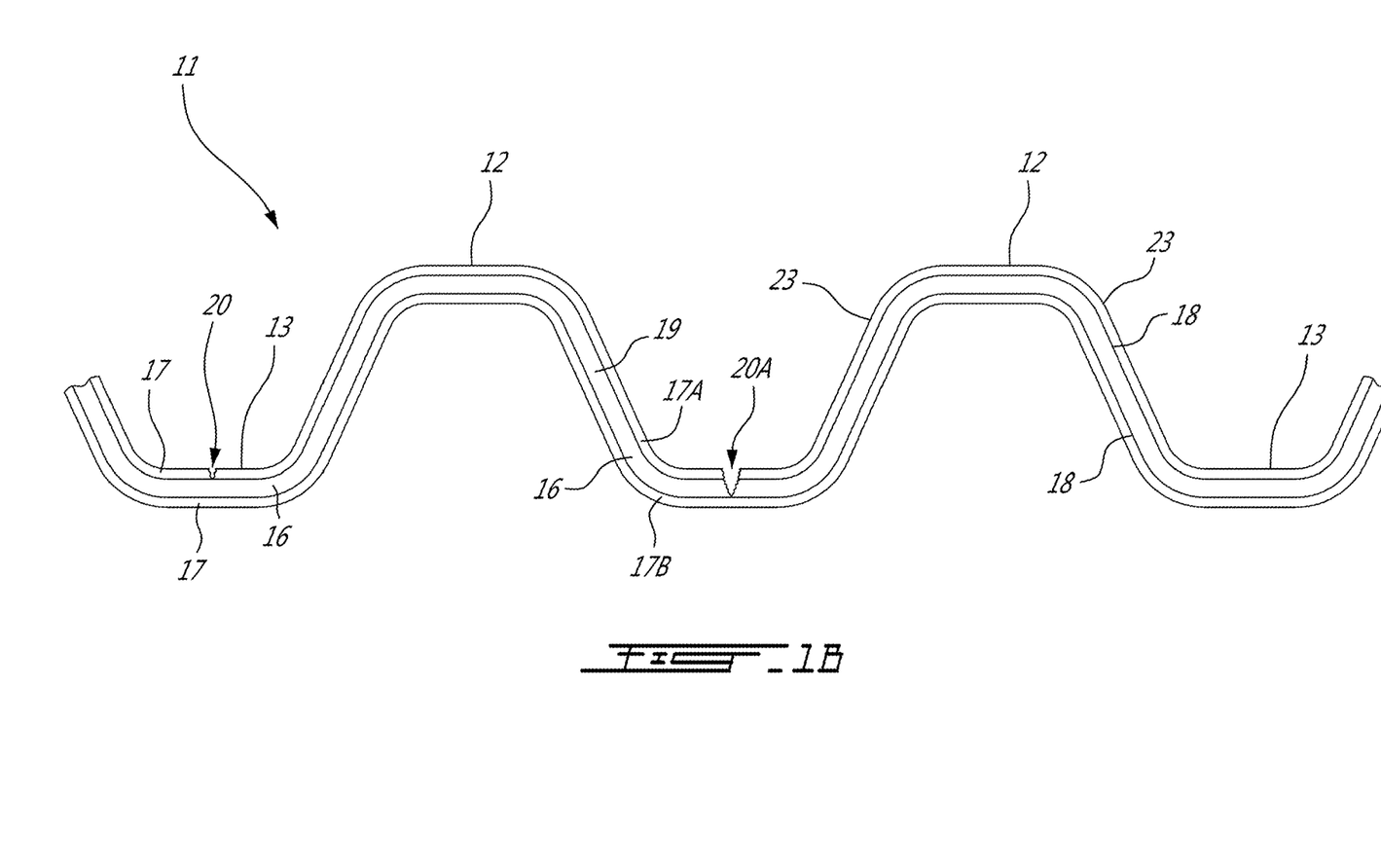
FIG. 1B is a schematic cross-sectional view of part of the composite material of FIG. 1A.
Figure 1C:
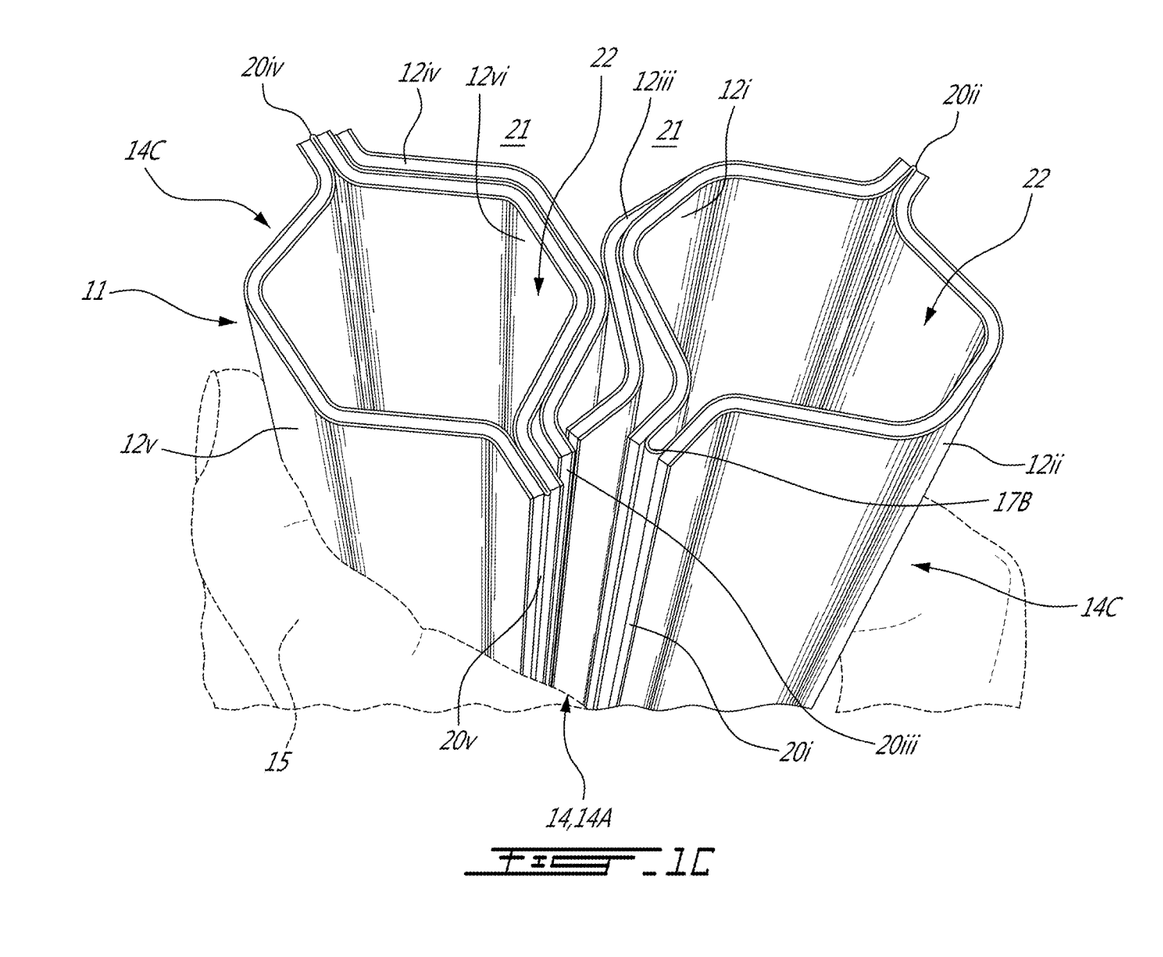
FIG. 1C is a perspective view of the sheet of FIG. 1A, being shown folded to form a structure.

FIGS. 1A to 1C illustrate a composite material 10. In the depicted embodiment, the composite material 10 is provided in sheet form, and therefore includes a sheet 11. The sheet 11 of composite material 10 has an undulated shape. As will be explained in greater detail below, the sheet 11 can be scored and manipulated to form a structure 14. The structure 14 formed by manipulating the undulated sheet 11 remains substantially rigid after the sheet 11 is manipulated, which provides strength to the structure 14, and allows it to be used for any suitable purpose which requires resistance to loads.

The sheet 11 undulates over its length and/or width. The term "undulated" refers to the sinuous form of the sheet 11. Although shown in FIG. 1A as having a succession of relatively flat valley portions alternating with relatively flat valley portions, other undulated shapes can be used, such as substantially sinusoidal, corrugated, wave-like, triangular wave, square wave, or any other suitable undulated shape. Irrespective of the form of the undulated sheet 11, it will have summit portions 12, valley portions 13, and intermediate portions 23 that each extend between and connect adjacent summit and valley portions 12,13. The summit and valley portions 12,13 alternate in that each summit portion 12 follows a valley portion 13 and vice versa. The terms "summit" and "valley" are used herein for convenience, and can be reversed. It will be appreciated that what constitutes a "summit" and a "valley" can vary depending on the orientation of the sheet 11, and on the position of an observer of the sheet 11, amongst other factors. For example, if the sheet 11 of FIG. 1A is flipped onto its other side, the summit and valley portions 12,13 would be inversed. Any other suitable term for referring to the opposed maxima and minima of the sheet 11 can therefore also be used, and it will therefore be appreciated that the summit and valley portions 12,13 are not limited to the configuration shown in FIG. 1A.

In the depicted embodiment, the undulations of the sheet 11 are oriented laterally and transverse to the longitudinal axis of the sheet 11. The undulations are also uniform throughout the sheet 11, such that the summit and valley portions 12,13 are separated by the same distance and have the same height. In alternate embodiments, the undulations of the sheet 11 can vary along the length and/or width of the sheet 11.

The composite material 10 can be used for structural applications, such as in walls, fencing, packaging, and other possible uses. More particularly, the sheet 11, which is shown in an unfolded configuration in FIG. 1A, can be folded or wrapped about one or more lines to form the structure 14, as shown in FIG. 1C. The structure 14 can be used in one or more of the above-described structural applications. In its folded configuration, the sheet 11 maintains its undulated shape, such that the summit and valley portions 12,13 can either abut against one another or be nested together, as described in greater detail below. By maintaining its undulated shape, the sheet 11 provides strength to the structure 14 formed thereby, as explained in greater detail below. In the depicted embodiment, the sheet 11 is manually folded to form the structure 14, which allows it to be quickly formed into the desired structure 14 by a user 15. In alternate embodiments, the sheet 11 can be folded or otherwise manipulated using a machine.

Referring to FIG. 1B, the sheet 11 is made up of multiple layers. In the depicted embodiment, the sheet 11 is defined by a rigid inner layer 16 sandwiched between two flexible outer layers 17. Stated differently, the rigid inner layer 16 is disposed between, and encased by, the flexible outer layers 17. The rigid inner layer 16 provides structure and strength to the sheet 11, and thus to the structure 14 formed by folding the sheet 11. The rigid inner layer 16 is therefore less flexible than the outer layers, although it will be appreciated that the rigid inner layer 16 can experience a certain amount of resilient flexion when placed under loads. The flexible outer layers 17 cover the rigid inner layer 16 along some or all of its extent. In contrast to the rigid inner layer 16, the flexible outer layers 17 are pliant and can be bent or folded without breaking. The flexible outer layers 17 are attached to the rigid inner layer 16 with a resin 18 applied to opposite surfaces of the rigid inner layer 16. It can thus be appreciated that the terms "rigid" and "flexible" are descriptors used herein to describe the relative flexibility of the inner and outer layers 16,17, in that the outer layers 17 are more flexible than the inner layer 16. This difference in flexibility between the inner and outer layers 16,17 allows the sheet 11 to be folded to form the structure 14, and also provides strength to the structure 14 so formed. It can thus be appreciated that any arrangement of materials, layer orientation, fiber orientation, or other material properties which provide the above-described difference in flexibility between the inner and outer layers 16,17 is within the scope of the present disclosure.

For example, and as shown in FIG. 1B, the difference in flexibility between the inner and outer layers 16,17 is achieved through the material composition of each layer 16,17. In the depicted embodiment, the inner layer 16 includes one ply of wood veneer 19. In alternate embodiments, the inner layer 16 can include a superposition of a plurality of plies of wood veneer, for instance. Each ply of wood veneer 19 is composed of a relatively thin slice of wood. Indeed, the wood veneer 19 may be made by "peeling" a circular wood log or by slicing large blocks of wood. Other techniques are possible. The type of wood used for the wood veneer 19 can vary. The layers of wood veneer 19 can be relatively thin, for example thinner than about 3 mm or 0.125 in. It is observed that the wood veneer 19 provides a relatively stiff resistance to bending in the direction of the orientation of its wood fibers. The outer layers 17 can be any suitable material that seals the resin 18 between the inner layer 16 and the corresponding outer layers 17. In the depicted embodiment, the outer layers 17 are in the form of a sheet of flexible material. The flexible material of the outer layers 17 may include, but is not limited to, paperboard, kraft paper, or a polymer. The outer layers 17 may also be coloured or be printed upon to provide a desired surface finish to the composite material 10 or structure 14.

In FIG. 1B, each of the inner and outer layers 16,17 are free of corrugation. Stated differently, the inner and outer layers 16,17 which make up the sheet 11 do not themselves have corrugation. In the depicted embodiment, the inner and outer layers 16,17 are instead flat liners or plies. In alternate embodiments, the inner and outer layers 16,17 which make up the sheet 11 have corrugation.

Referring to FIGS. 1A to 1C, the sheet 11 is foldable about one or more score lines 20 to form the structure 14. When formed, each score line 20 extends along a length or width of the sheet 11. In most embodiments, but not necessarily all, each score line will extend along the length of the sheet 11 and parallel to the length of a valley or summit portion 12,13. In the depicted embodiment, the score lines 20 are formed along the valley portions 13. In alternate embodiments, one or more score lines can be formed along the sloped surface of the intermediate portions 23 between adjacent summit and valley portions 12,13. It can thus be appreciated that the score lines 20 can be formed anywhere on the sheet 11 and wherever the user 15 wishes to create a line about which the sheet 11 can be folded to form the structure 14.

In the depicted embodiment, the score lines 20 are not pre-formed on the sheet 11, and are instead formed by the user 15 with a suitable scoring tool prior to folding the sheet 11 to form the structure 14. More particularly, each score line 20 is formed when the user 15 cuts through at least one of the flexible outer layers 17A. Stated differently, and in the depicted embodiment, the user 15 cuts through one of the outer layers 17A, while keeping the rigid inner layer 16 and the other outer layer 17B intact. By cutting through one of the outer layers 17A, the user 15 severs the layer 17A and allows the sheet 11 to be folded. If only one of the outer layers 17A is scored, the rigid inner layer 16 and the other outer layer 17B may remain intact and extend across the score line 20 to maintain the integrity of the sheet 11. Alternatively, if only one of the outer layers 17A is scored, the rigid inner layer 16 may be ruptured by bending the sheet 11, such that only the other outer layer 17B remains intact and extends across the score line 20 to maintain the integrity of the sheet 11. Referring to FIG. 1B, another possible score line 20A is shown. The score line 20A extends through both the outer layer 17A and the rigid inner layer 16 while leaving the outer layer 17B intact. In an alternate embodiment, the score line 20 extends through the outer layer 17A and only partially through the rigid inner layer 16, thereby forming a groove in the rigid inner layer 16. In such an embodiment, the score line 20 does not extend through the rigid inner layer 16, and does not extend through the outer layer 17B. Therefore, the score lines 20,20A described above sever just enough of the sheet 11 to allow it to fold, while not severing too much of the sheet 11 such that it separates into pieces or breaks. With score line 20A, scoring through the flexible outer layer 17B and through the rigid inner layer 16 separates the rigid layer 16 and one of the flexible layers 17B to allow the sheet 11 to fold without breaking.

In the depicted embodiment, the sheet 11 is defined by two outer layers 17 and one inner layer 16. In alternate embodiments, where the sheet 11 is defined by more inner and outer layers 16,17, the score lines 20 extend through more or different layers 16,17 than shown in the figures or described above, to allow the sheet 11 to fold while maintaining its integrity. In further alternate embodiments, the score lines 20 are pre-formed on the sheet 11 to facilitate scoring of the layers 16,17.

Referring to FIG. 1C, the sheet 11 is folded to form the structure 14 in the shape of a protective corner 14A or corner protector. The protective corner 14A can be applied to the side surfaces 21 of an object which meet to form a corner of the object. Such a protective corner 14A can be used as a packaging insert to protect an object, such as an appliance, from damage during transportation. Other uses are also possible. To form the protective corner 14A, the user 15 forms five score lines 20 to fold the sheet 11 at said score lines 20. The first score line 20$i$ is positioned between an adjacent first summit portion 12$i$ and a second summit portion 12$ii$, and allows the first summit portion 12$i$ to be folded in a first direction (i.e. inwardly) towards the second summit portion 12$ii$ so that a cavity 22 is formed therebetween. The second score line 20$ii$ is positioned between the second summit portion 12$ii$ and a third summit portion 12$iii$, and allows the third summit portion 12$iii$ to be folded towards the first summit portion 12$i$ so that the first summit portion 12$i$ is nested within the third summit portion 12$iii$. The first, second, and third summit portions 12$i$, 12$ii$, 12$iii$ form one wing 14C of the protective corner 14A.

The third score line 20$iii$ is positioned between the third summit portion 12$iii$ and a fourth summit portion 12$iv$, and allows the fourth summit portion 12$iv$ to be folded to abut against one of the side surfaces 21 of the object. In the depicted embodiment, the third score line 20$iii$ allows the third summit portion 12$iii$ and the fourth summit portion 12$iv$ to fold in a second direction opposite to the first direction (i.e. outwardly rather than inwardly). The fourth score line 20$iv$ is positioned between the fourth summit portion 12$iv$ and a fifth summit portion 12$v$, and allows the fifth summit portion 12$v$ to be folded towards the fourth summit portion 12$iv$ so that another cavity 22 is formed therebetween. The fifth and final score line 20$v$ is positioned between fifth summit portion 12$v$ and a sixth summit portion 12$vi$, and allows the sixth summit portion 12$vi$ to be folded towards the fifth summit portion 12$v$ so that the sixth summit portion 12$vi$ is nested within the fourth summit portion 12$iv$. The fourth, fifth, and sixth summit portions 12$iv$, 12$v$, 12$vi$ form the other wing 14C of the protective corner 14A. As can be seen, the flexible outer layer 17B of the sheet 11 that has not been scored remains intact and extends across at least some of the score lines 20, for example, the first score line 20$i$, to thereby link the summit portions 12$i$, 12$ii$.

Still referring to FIG. 1C, it can thus be appreciated that the third score line 20$iii$ allows the sheet 11 to fold outwardly. More particularly, the third score line 20$iii$ allows the crests of the adjacent third and fourth summit portions 12$iii$, 12$iv$ to fold in a second direction towards each other and to abut each other. This outward folding of the sheet 11 forms adjacent folded segments or wings 14C of the sheet 11, which are linked by the flexible outer layer 17B that has not been scored. An angle is defined between the folded wings 14C. In the depicted embodiment, the angle is about 90°.

By maintaining its undulated shape even after being manipulated to form the structure 14, as shown in FIG. 1C, the sheet 11 provides strength to the structure 14. More particularly, the summit and valley portions 12,13 are abutted against one another or nested together when the sheet 11 is manipulated to form the structure 14. Since the rigid inner layer 16 of the sheet 11 remains intact and unaffected throughout the sheet 11 except at the score lines 20, the rigid inner layer 16 continues to provide structure and strength to the abutted/nested summit and valley portions 12,13 of the sheet 11, and thus to the structure 14 formed thereby. It can thus be appreciated that the sheet 11 remains rigid even after being manipulated because of its rigid inner layer 16. This allows the final structure 14 to serve a structural purpose, and to maintain its structural integrity when parts of the structure 14 are exposed to loads.

Figure 2A:
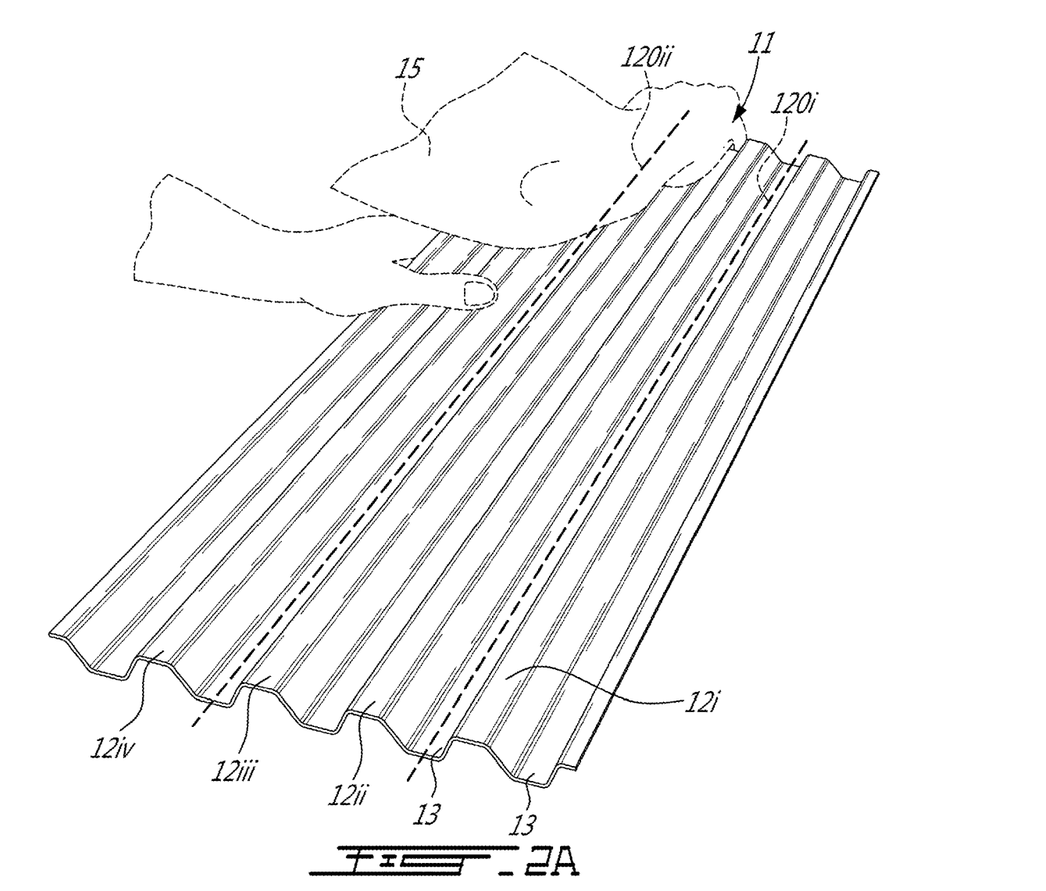
FIG. 2A is a perspective view of the sheet of FIG. 1A and of a tool for scoring the sheet.
Figure 2B:
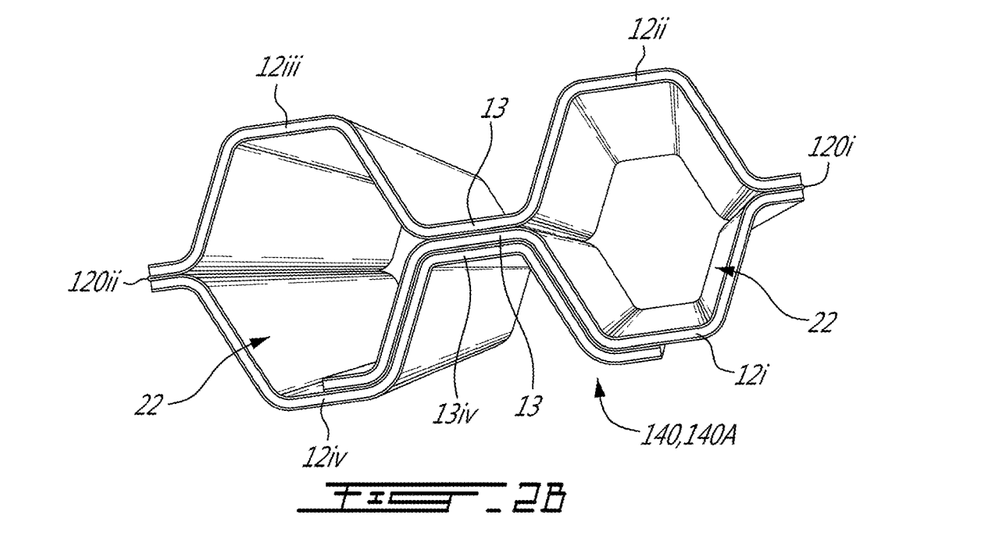
FIG. 2B is a perspective view of the sheet of FIG. 2A, being shown folded to form another structure.

FIGS. 2A and 2B show the sheet 11 having a different configuration of score lines 120 to be folded to form a different structure 140. More particularly, two score lines 120$i$, 120$ii$ are formed by the user 15 between adjacent summit portions 12 of the sheet 11. The first score line 120$i$ is positioned between the adjacent first summit portion 12$i$ and the second summit portion 12$ii$, and allows the first summit portion 12$i$ to be folded towards the second summit portion 12$ii$ so that the cavity 22 is formed therebetween. Folding the sheet 11 in this sequence allows different valley portions 13 to abut against one another. The second score line 120$ii$ is positioned between the third summit portion 12$iii$ and the fourth summit portion 12$iv$, and allows the fourth summit portion 12$iv$ to be folded towards the third summit portion 12$iii$ until the valley portion 13$iv$ adjacent the fourth summit portion 12$iv$ nests within the valley portion 13 adjacent the first summit portion 12$i$. The sheet 11 is therefore folded to form the structure 140 in the shape of an elongated tube or post 140A with two cavities 22 therein. The hollow post 140A can be filled with any desirable material. For example, the hollow post 140A can be filled with a cementitious material, such as concrete. The hollow post 140A in such a configuration can therefore serve as a mold for forming a cement structure.

Figure 3A:
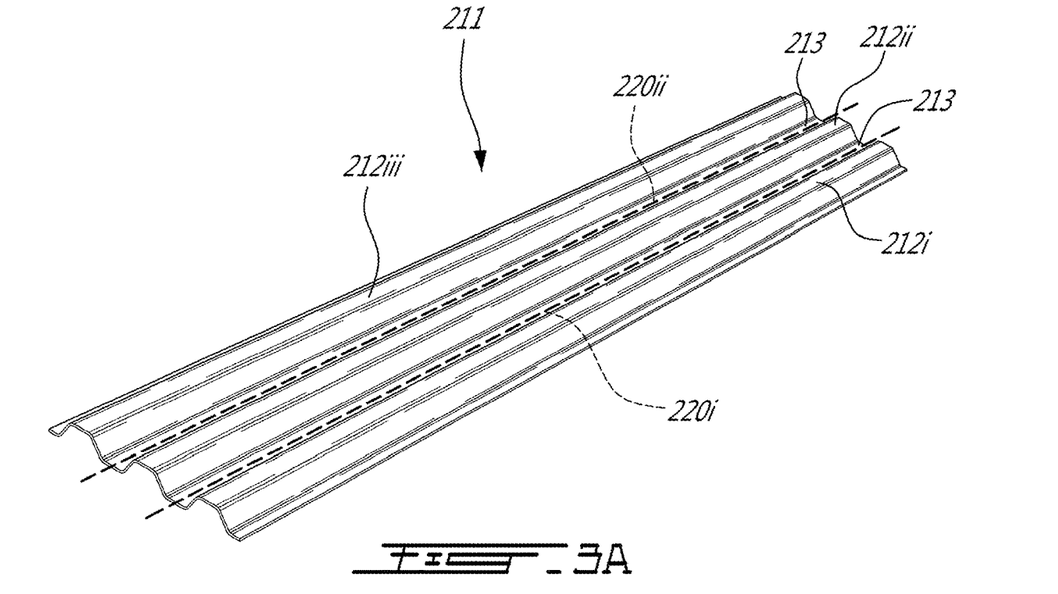
FIG. 3A is a perspective view of a sheet of a composite material, according to another embodiment of the present disclosure.
Figure 3B:
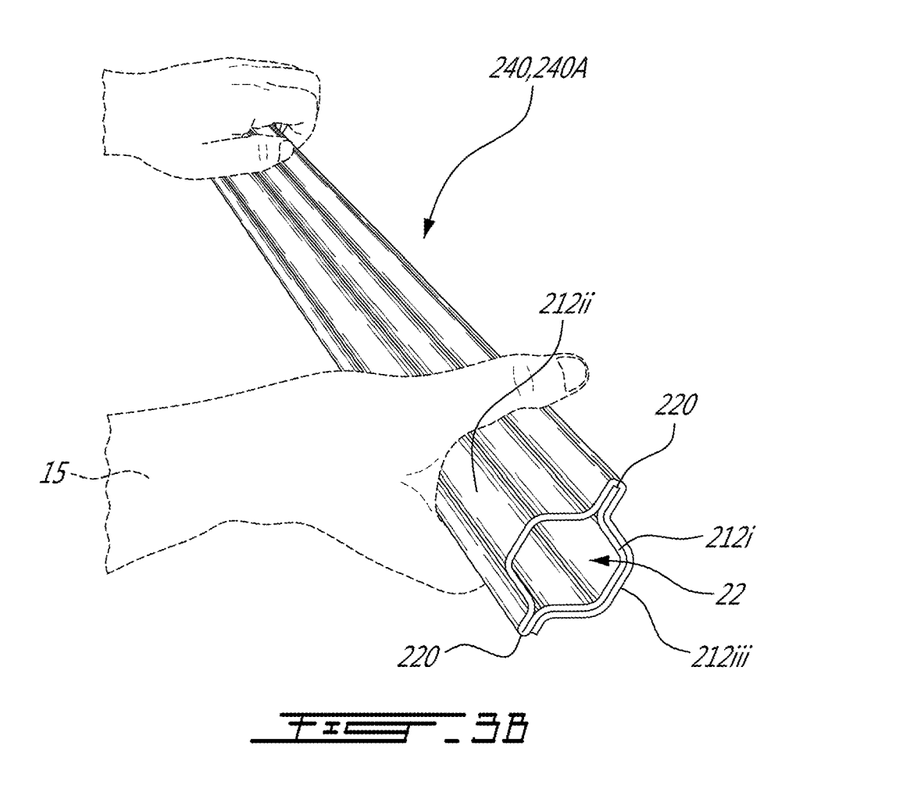
FIG. 3B is a perspective view of the sheet of FIG. 3A, being shown folded to form yet another structure.

FIGS. 3A and 3B show another embodiment of the sheet 211. The sheet 211 has three summit portions 212 and two valley portions 213. Two score lines 220$i$,220$iii$ are formed by the user 15 between the summit portions 212. The first score line 220$i$ is positioned between the first summit portion 212$i$ and the second summit portion 212$ii$, and allows the first summit portion 212$i$ to be folded towards the second summit portion 212$ii$ so that the cavity 22 is formed therebetween. The second score line 220$ii$ is positioned between the second summit portion 212$ii$ and the third summit portion 212$iii$, and allows the third summit portion 212$iii$ to be folded towards the second summit portion 212$ii$ so that the first summit portion 212$i$ nests within the third summit portion 212$iii$. The sheet 211 is therefore folded to form the structure 240 in the shape of an elongated tube or post 240A with one cavity 22 therein. The hollow post 240A can be filled with any desirable material. For example, the hollow post 240A can be filled with a cementitious material, such as concrete. The hollow post 240A in such a configuration can therefore serve as a mold for forming a cement structure.

Figure 4:
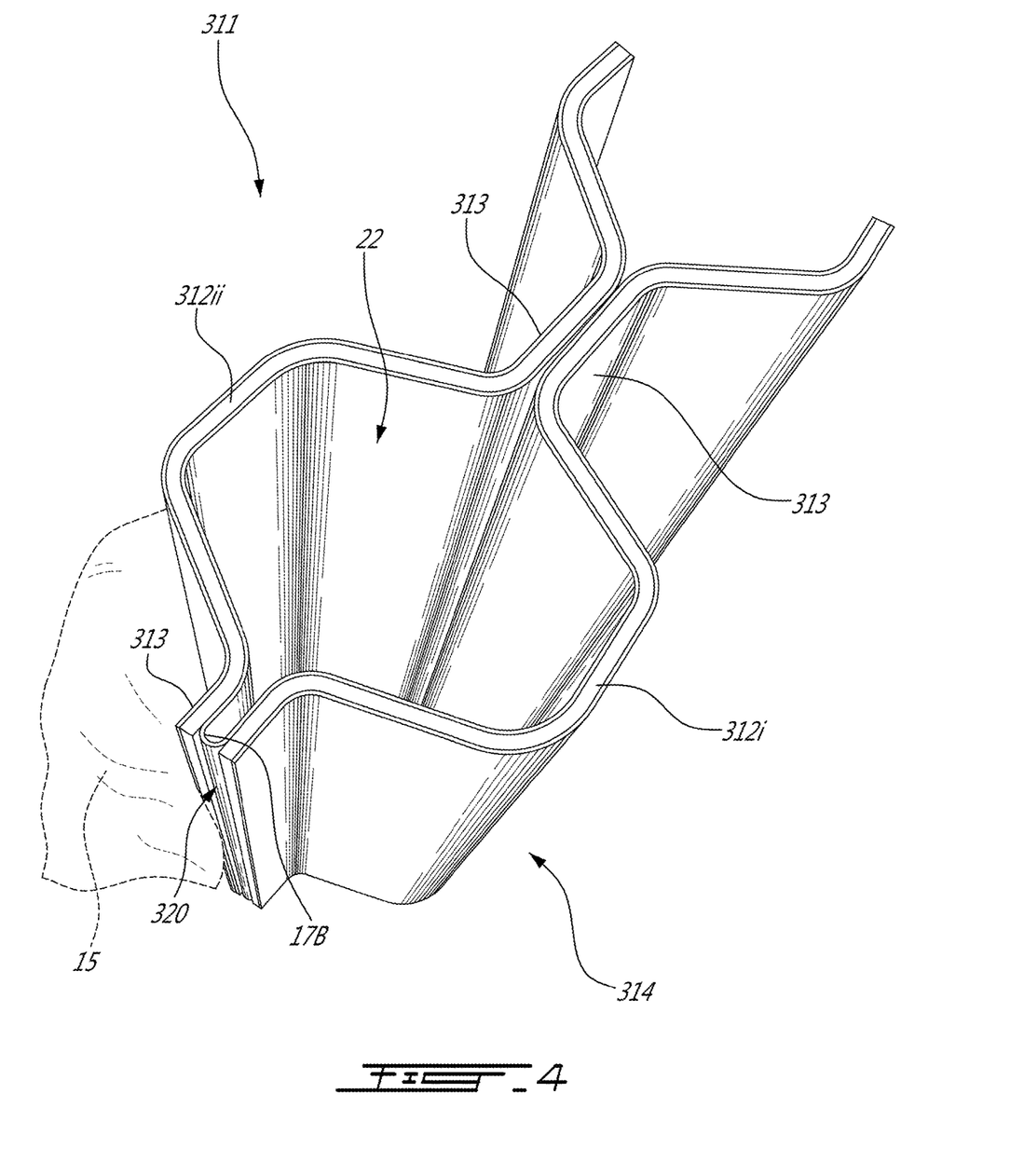
FIG. 4 is a perspective view of a sheet of a composite material being shown folded to form yet another structure, according to yet another embodiment of the present disclosure.

FIG. 4 shows another embodiment of the sheet 311. The sheet 311 has two summit portions 312 and three valley portions 313. One score line 320 is formed by the user 15 between the summit portions 312. The score line 320 is positioned between the first summit portion 312$i$ and the second summit portion 312$ii$, and allows the first summit portion 312$i$ to be folded inwardly so that two valley portions 313 abut against one another. Folding the sheet 311 in this sequence also allows the second summit portion 312$ii$ to be spaced from the first summit portion 312$i$, thereby defining the cavity 22. The sheet 311 is therefore folded to form the structure 314 with one cavity 22 therein. As can be seen, the flexible outer layer 17B of the sheet 311 that is not scored remains intact and extends across the score line 320 to link the summit portions 312*i*,312*ii*. This configuration of the sheet 311 therefore folds onto itself.

Figure 5:
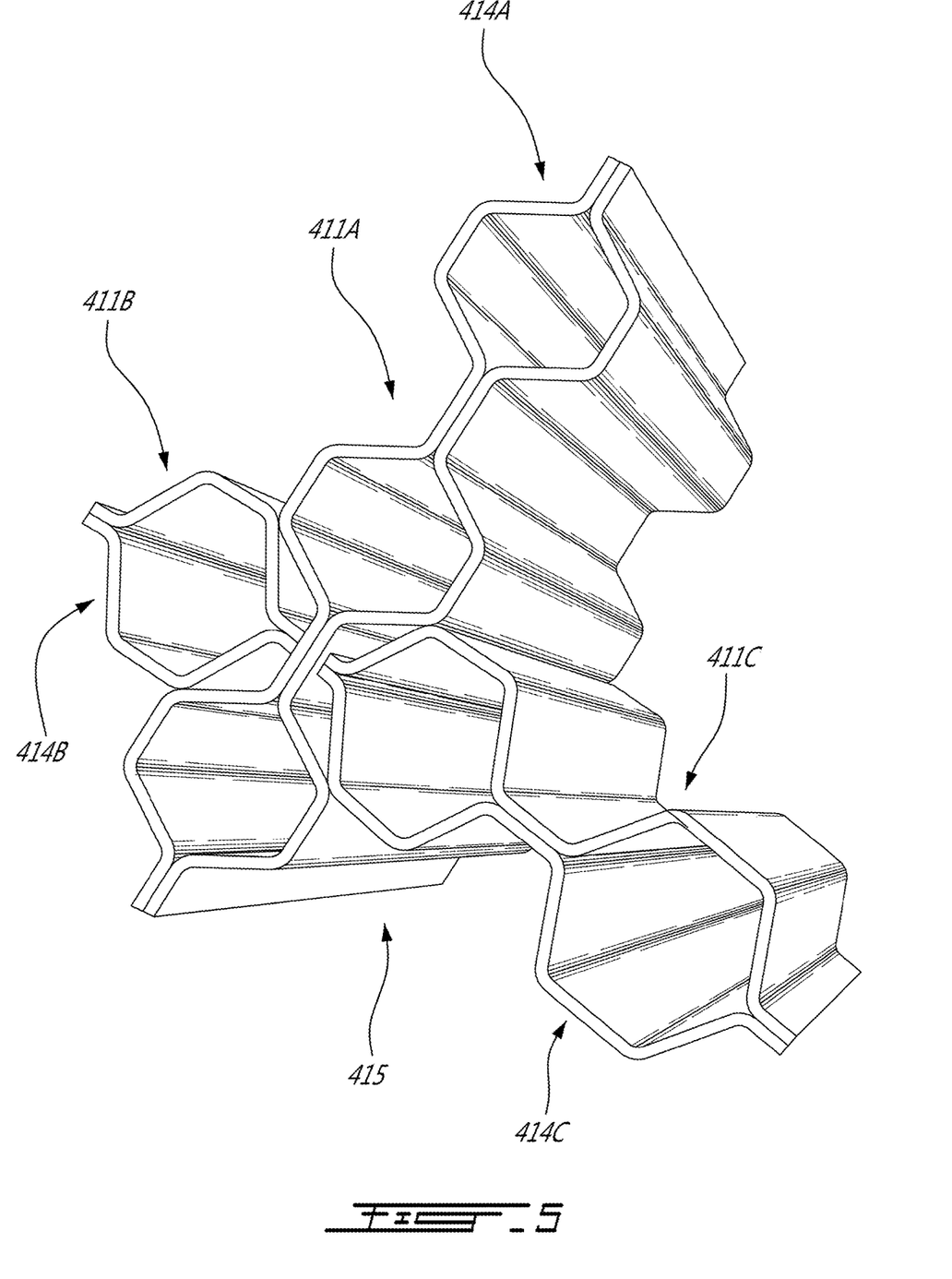
FIG. 5 is a perspective view of sheets of a composite material being shown folded to form yet more structures, according to yet another embodiment of the present disclosure.
Figure 9:
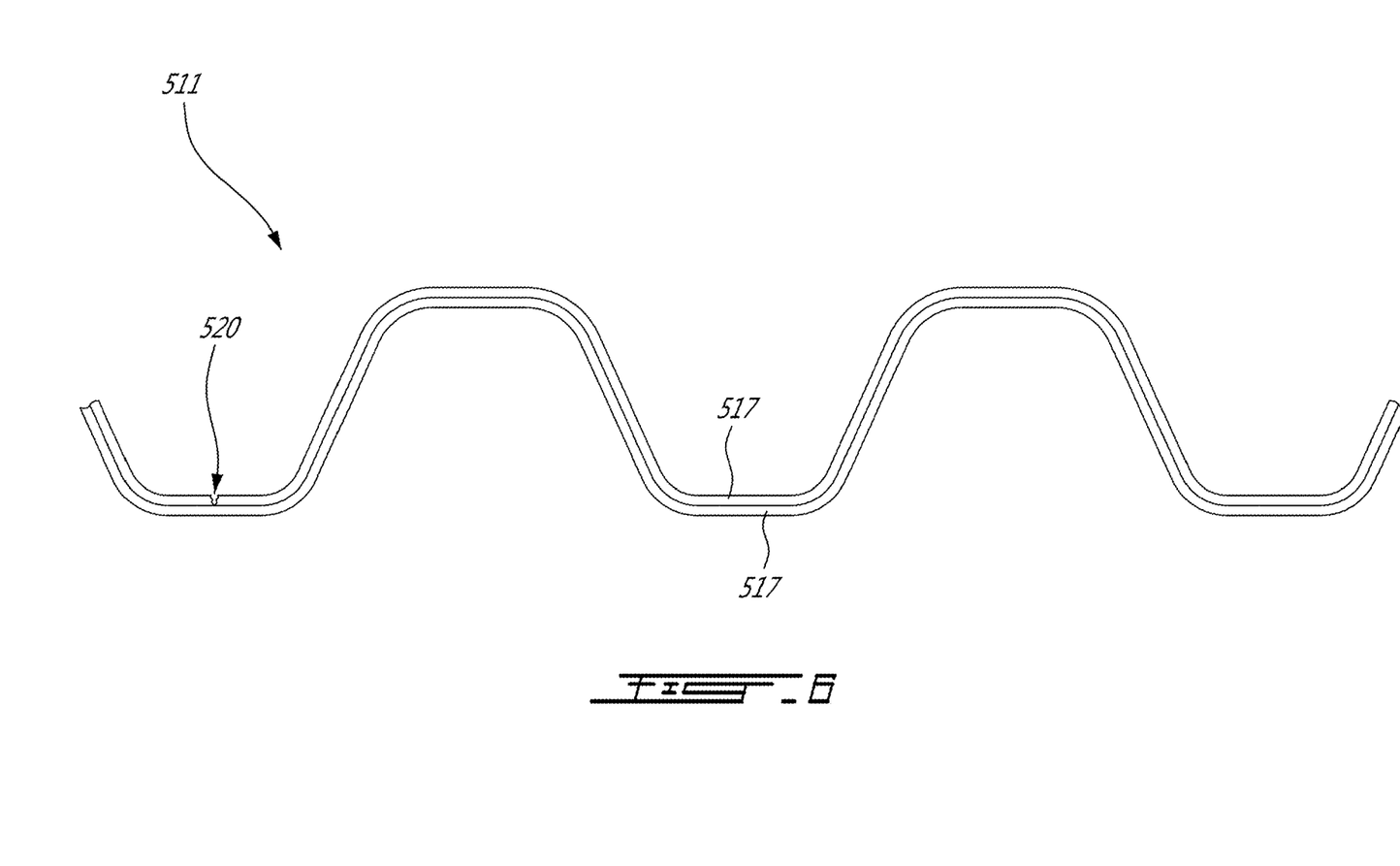

FIG. 5 is an arrangement of different three sheets 411A, 411B,411C to form an "L"-shaped corner 415. Each sheet 411A,411B,411C is folded to form a unique structure 414A, 414B,414C which is combined with the other structures 414A,414B,414C to form the larger component, the L-shaped corner 415.

FIG. 6 shows another embodiment of the sheet 511 for forming a structure such as any of the structures presented above. In this embodiment, the sheet 511 includes two flexible paper layers 517. In the depicted embodiment, the sheet 511 does not have a rigid inner layer. In an alternate embodiment, the sheet 511 has more than two flexible paper layers 517. The flexible paper layers 517 are superimposed to form the structure of the sheet 511. The flexible material of the paper layers 517 may include, but is not limited to, paperboard and kraft paper. The paper layers 517 may also be coloured or be printed upon to provide a desired surface finish to the structure. In the depicted embodiment, the at least one score line 520 extends through one of the flexible paper layers 517 and the sheet 511 is folded about the score line 520. In an alternate embodiment where the sheet 517 is composed of more than two paper layers 517, the score line may extend through more than one paper layer 517, or only a single one of the paper layers 517.

In light of the preceding, it can be appreciated that the composite material 10 disclosed herein has a sheet 11 which, in at least some embodiments, has a homogenous undulated shape and allows the user 15 to strategically select score lines 20. The selection of suitable score lines 20, and the scoring of the sheet 11, allows the user 15 to fold or wrap the sheet 11 to produce many different types of structures 14.

The sheets 11,211,311,411,511 can be mass manufactured in large quantities to any suitable dimension. If the user 15 requires the sheet 11,211,311,411,511 to be a particular size, s/he can easily remove sections of the sheet 11,211,311,411, 511 by cutting them off. The user 15 can then score the sheet 11,211,311,411,511 and fold it to produce the desired structure 14 on site to form the desired structure 14. The sheet 11,211,311,411,511 disclosed therein is therefore a cost-effective, lightweight, and convenient tool for making suitable structures 14.

The sheet 11,211,311,411,511 disclosed herein can also be shipped flat such that the summit and valley portions 12,13 of the stacked sheets 11,211,311,411,511 nest within one another. It is therefore possible to reduce the amount of air, and thus volume, involved in shipping the sheets 11,211, 311,411,511.

The above description is meant to be exemplary only, and one skilled in the art will recognize that changes may be made to the embodiments described without departing from the scope of the invention disclosed. Still other modifications which fall within the scope of the present invention will be apparent to those skilled in the art, in light of a review of this disclosure, and such modifications are intended to fall within the appended claims.

The invention claimed is:

1. A composite material foldable to form a structure, comprising:
a sheet having a rigid inner layer sandwiched between flexible outer layers, the sheet having an undulated shape with alternating summit and valley portions and intermediate portions extending between adjacent summit and valley portions, the sheet having a plurality of spaced apart score lines, each score line formed parallel to the summit and valley portions and extending through at least one of the flexible outer layers, the sheet being foldable along the plurality of spaced apart score lines to form the structure, the folded structure comprising a plurality of segments, adjacent segments linked across one of the plurality of score lines, the plurality of segments defining:
at least one cavity formed by two abutting segments and having at least one internal space defined by two spaced apart summits or valleys and their corresponding intermediate portions, and
at least one overlap formed by two nested segments and having at least one interface defined by two contacting summits, two contacting valleys, or a valley contacting a summit and their contacting intermediate portions.

2. The composite material of claim 1, wherein at least one of the plurality of score lines further extends at least partially through the rigid inner layer.

3. The composite material of claim 2, wherein the at least one of the plurality of score lines extends completely through the rigid inner layer, the other flexible outer layer remaining intact.

4. The composite material as defined in claim 3, wherein when the sheet is folded, the link across the at least one of the plurality of score lines is formed by the other flexible outer layers.

5. The composite material as defined in claim 1, wherein, when the sheet is folded, the two abutting segments comprise valley portions against one other and the at least one cavity defined by two spaced apart summit portions and their corresponding intermediate portions.

6. The composite material as defined in claim 1, wherein, when the sheet is folded, the two abutting segments comprise a plurality of pairs of valley portions against one another and the at least one cavity is a plurality of cavities, each cavity comprising an internal space defined by two spaced apart summit portions and their corresponding intermediate portions.

7. The composite material as defined in claim 1, wherein, when the sheet is folded, at least two of the plurality of segments of the structure are formed, each of the two segments comprising at least one summit portion folded to abut the summit portion of another segment, such that an angle of 90° is defined between the at least two segments and between the abutted summit portions.

8. The composite material as defined in claim 1, wherein the inner and outer flexible layers are flat plies formed into the undulated shape.

9. The composite material as defined in claim 1, wherein at least one of the plurality of score lines is defined along one of the summit or valley portions.

10. The composite material as defined in claim 1, wherein at least one of the plurality of score lines is defined along one of the intermediate portions.

11. The composite material as defined in claim 1, wherein the flexible outer layers are flexible paper outer layers.

12. The composite material as defined in claim 1, wherein the inner layer includes a wood veneer having wood fibers, and the outer layers include a paper liner.

13. The composite material as defined in claim 1, wherein the at least one of the plurality of score lines is formed by cutting.

14. A method of forming a structure from the sheet of claim 1, the method comprising:

making a tear in the sheet through at least one of the flexible outer layers of the sheet to define the plurality of spaced apart score lines; and folding the sheet along each of the plurality of score lines to form the structure.

15. The method as defined in claim 14, wherein folding the sheet includes folding the sheet to abut valley portions of the undulated sheet against one another.

16. The method as defined in claim 14, wherein folding the sheet includes folding the sheet to abut summit portions of the undulated sheet against one another.

17. The method as defined in claim 14, wherein making the tear includes one of cutting the sheet to define the score line and opening a pre-formed score line.

18. A structure, comprising:
a composite material comprising a sheet having a rigid inner layer sandwiched between flexible outer layers, the sheet having an undulated shape with alternating summit and valley portions and intermediate portions extending between adjacent summit and valley portions, the sheet comprising a plurality of spaced apart score lines, each score line formed parallel to the summit and valley portions and extending through at least one of the flexible outer layers, the sheet being folded along the plurality of spaced apart score lines to form the structure, the structure comprising a plurality of segments, adjacent segments linked across one of the plurality of score lines, the plurality of segments defining:
  at least one cavity formed by two abutting segments and having at least one internal space defined by two spaced apart summits or valleys and their corresponding intermediate portions, and
  at least one overlap formed by two nested segments and having at least one interface defined by two contacting summits, two contacting valleys, or a valley contacting a summit and their corresponding intermediate portions.

19. The structure as defined in claim 18, wherein the structure is a hollow post, the two abutting segments comprising at least a pair of valley portions against one other, the at least one cavity having an internal space defined by two spaced apart summit portions and their corresponding intermediate portions.

20. The structure as defined in claim 18, wherein the structure is a corner protector, at least two of the plurality of segments of the structure are formed, each of the two segments comprising at least one summit portion folded to abut the summit portion of the other segment, such that an angle of 90° is defined between the at least two segments and between the abutted summit portions.

21. A structure, comprising:
a composite material comprising a sheet having at least two flexible paper layers being superimposed, the sheet having an undulated shape with alternating summit and valley portions and intermediate portions extending between adjacent summit and valley portions, the sheet comprising a plurality of spaced apart score lines, each score line formed parallel to the summit and valley portions and extending through at least one of the flexible paper layers and not all the flexible paper layers, the sheet being folded along the plurality of spaced apart score lines to form the structure, the structure comprising a plurality of segments, adjacent segments linked across one of the plurality of score lines, the plurality of segments defining:
  at least one cavity formed by two abutting segments and having at least one internal space defined by two spaced apart summits or valleys and their corresponding intermediate portions, and
  at least one overlap formed by two nested segments and having at least one interface defined by two contacting summits, two contacting valleys, or a valley contacting a summit and their corresponding intermediate portions.

* * * * *